United States Patent
Ristau et al.

(10) Patent No.: US 11,168,569 B1
(45) Date of Patent: Nov. 9, 2021

(54) BLADES HAVING TIP POCKETS

(71) Applicant: General Electric Company, Schenectady, NY (US)

(72) Inventors: Neil Devin Ristau, Simpsonville, SC (US); Michael Anthony Wondrasek, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/851,371

(22) Filed: Apr. 17, 2020

(51) Int. Cl.
| F01D 5/18 | (2006.01) |
| F01D 5/22 | (2006.01) |
| F01D 5/16 | (2006.01) |

(52) U.S. Cl.
CPC ............... *F01D 5/18* (2013.01); *F01D 5/16* (2013.01); *F01D 5/225* (2013.01); *F05D 2240/307* (2013.01); *F05D 2260/96* (2013.01)

(58) Field of Classification Search
CPC . F01D 5/225; F01D 25/06; F01D 5/16; F01D 5/18; F01D 5/20; F01D 5/147; F04D 29/668; F05D 2260/96; F05D 2240/307
See application file for complete search history.

(56) References Cited

U.S. PATENT DOCUMENTS

| 1,970,435 A | * | 8/1934 | Sharp | F03B 3/06 |
| | | | | 73/455 |
| 4,097,192 A | * | 6/1978 | Kulina | F01D 5/14 |
| | | | | 416/175 |
| 4,497,613 A | * | 2/1985 | Carreno | F01D 5/16 |
| | | | | 416/228 |
| 7,033,131 B2 | * | 4/2006 | Schreiber | F01D 5/147 |
| | | | | 415/12 |
| 7,413,409 B2 | * | 8/2008 | Lewis | F01D 5/20 |
| | | | | 416/232 |
| 2005/0084380 A1 | * | 4/2005 | Fett | F01D 5/16 |
| | | | | 416/233 |
| 2014/0255207 A1 | | 9/2014 | Boyer | |
| 2015/0211373 A1 | * | 7/2015 | Subbareddyar | F01D 5/225 |
| | | | | 416/212 A |
| 2015/0322803 A1 | * | 11/2015 | Fulayter | F01D 5/26 |
| | | | | 416/231 B |
| 2020/0116045 A1 | * | 4/2020 | Kray | F01D 5/282 |

* cited by examiner

*Primary Examiner* — Christopher Verdier
(74) *Attorney, Agent, or Firm* — Charlotte Wilson; Hoffman Warnick LLC (57) ABSTRACT

A rotor blade for use in a turbine of a combustion turbine engine comprises an airfoil, which includes a concave pressure and convex suction sidewall extending axially between corresponding leading and trailing edges and radially between base and outboard tip end. The rotor blade further including at least one mid-span shroud engages a corresponding mid-span shroud on at least one neighboring rotor blade. The airfoil includes an inboard region between the at least one mid-span shroud and base of the blade—and an outboard region between at least one mid-span shroud and outward tip. The outboard region includes at least two cavities extending from the outboard tip end inboard toward the at least one mid-span shroud; and inboard of the at least one mid-span shroud, the inboard region is substantially solid.

19 Claims, 8 Drawing Sheets

BLADES HAVING TIP POCKETS

BACKGROUND OF THE DISCLOSURE

The present application relates generally to apparatus, methods and/or systems concerning the design and operation of turbine rotor blades. More specifically, but not by way of limitation, the present application relates to apparatus and systems pertaining to turbine blades and configurations of turbine blades having tip pockets.

BRIEF DESCRIPTION OF THE DISCLOSURE

The present application describes a rotor blade for use in a turbine of a combustion turbine engine. The rotor blade comprises an airfoil. The airfoil including a concave pressure sidewall and a convex suction sidewall extending axially between corresponding leading and trailing edges and radially between the base and an outboard tip end. The rotor blade further including at least one mid-span shroud configured to engage a corresponding mid-span shroud on at least one neighboring rotor blade during operation. The airfoil further includes an inboard region between the at least one mid-span shroud and the base of the blade with an inboard direction of the airfoil toward the base; and an outboard region between the at least one mid-span shroud and the outward tip end of the blade with an outboard direction of the airfoil toward the outward tip end. The outboard region includes at least two cavities extending from the outboard tip end inboard of the airfoil toward the at least one mid-span shroud; and inboard of the at least one mid-span shroud, the inboard region is substantially solid.

Another aspect of the application sets forth a combustion turbine engine that comprises a rotor blade including an airfoil including a concave pressure sidewall and a convex suction sidewall extending axially between corresponding leading and trailing edges and radially between the base and an outboard tip end. The rotor blade further including at least one mid-span shroud configured to engage a corresponding mid-span shroud on at least one neighboring rotor blade during operation. The airfoil further includes an inboard region between the at least one mid-span shroud and the base of the blade with an inboard direction of the airfoil toward the base; and an outboard region between the at least one mid-span shroud and the outward tip end of the blade with an outboard direction of the airfoil toward the outward tip end. The outboard region includes at least two cavities extending from the outboard tip end inboard of the airfoil toward the at least one mid-span shroud; and inboard of the at least one mid-span shroud, the inboard region is substantially solid. These and other features of the present application will become apparent upon review of the following detailed description of the preferred embodiments when taken in conjunction with the drawings and the appended claims.

BRIEF DESCRIPTION OF THE DRAWINGS

These and other features of this disclosure will be more completely understood and appreciated by careful study of the following more detailed description of exemplary embodiments of the disclosure taken in conjunction with the accompanying drawings, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE DISCLOSURE

As an initial matter, it will be appreciated that to discuss the disclosure of the present application, it may be necessary to select terminology to refer to and describe particular components within a combustion turbine engine. Whenever possible, common industry terminology will be used and employed in a manner consistent with its accepted meaning. However, it is meant that any such terminology be given a broad meaning and not narrowly construed such that the meaning intended herein and the scope of the appended claims is unreasonably restricted. Those of ordinary skill in the art will appreciate that often a particular component may be referred to using several different terms. In addition, what may be described herein as being single part may include and be referenced in another context as consisting of multiple components, or, what may be described herein as including multiple components may be referred to elsewhere as a single part. As such, in understanding the scope of the present disclosure, attention should not only be paid to the terminology and description provided herein, but also to the structure, configuration, function, and/or usage of the component, particularly as provided in the appended claims.

In addition, several descriptive terms may be used regularly herein, and it should prove helpful to define these terms at the onset of this section. Accordingly, these terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. As such, the term "downstream" corresponds to the direction of flow of the fluid, and the term "upstream" refers to the direction opposite to the flow. The terms "forward" and "aft", without any further specificity, refer to directions, with "forward" referring to the forward or compressor end of the engine, and "aft" referring to the aft or turbine end of the engine. The term "radial" refers to movement or position perpendicular to an axis. It is often required to describe parts that are at differing radial positions with regard to a center axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine, or, when referring to components within a combustor, the center axis of the combustor.

In a combustion turbine engine, it is well known that air pressurized in a compressor is used to combust a fuel in a combustor to generate a flow of hot combustion gases, whereupon such gases flow downstream through one or more turbines so that energy can be extracted therefrom. In accordance with such a turbine, generally, rows of circumferentially spaced turbine rotor blades extend radially outwardly from a supporting rotor disc. Each blade typically includes a dovetail that permits assembly and disassembly of the blade in a corresponding dovetail slot in the rotor disc, as well as an airfoil that extends radially outwardly from the dovetail and interacts with the flow of the working fluid through the engine. The airfoil has a generally concave pressure side and generally convex suction side extending axially between corresponding leading and trailing edges and radially between a root and a tip. It will be understood that the blade tip is spaced closely to a radially outer stationary shroud for minimizing leakage therebetween of the combustion gases flowing downstream between the turbine blades.

Shrouds at the tip of the airfoil or tip shrouds often are implemented on aft stages or rotor blades to provide damping and reduce the over-tip leakage of the working fluid. Given the length of the rotor blades in the aft stages, the damping function of the tip shrouds provides a significant performance benefit. However, taking full advantage of the damping function may be difficult considering the weight that the tip shroud adds to the assembly and the other criteria which include enduring thousands of hours of operation exposed to high temperatures and extreme mechanical loads. Thus, while large tip shrouds are desirable because they seal the gas path more effectively and may provide significant connection between neighboring rotor blades, which may improve damping, larger tip shrouds may increase load on the rotor blade.

Output and efficiency of gas turbine engines improve as the size of the engine and, and more specifically, the amount of air able to pass through it increase. The size of the engine, however, is limited by operable length of the turbine blades, with longer turbine rotor blades enabling enlargement of the flow path through t h e engine. Longer rotor blades, though, incur increased mechanical loads, which place further demands on the blades and the rotor disc that holds them. Longer rotor blades m a y also decrease the natural vibrational frequencies of the blades during operation, which increases the vibratory response of the rotor blades. Additional vibratory load may place demands on t h e rotor blade, which may further shorten the life of the component and, in some cases, may cause vibratory loads. One way to address the vibratory load of longer rotor blades is through shrouds that connect adjacent rotor blades to each other.

Another way to address this vibrational load is to position one or more shrouds lower on the airfoil of the rotor blade. That is, instead of adding the shroud to the tip of the rotor blade, shrouds can be positioned near the middle radial portion of the airfoil. As used herein, such shrouds will be referred to as a "mid-span shroud(s)." At this lower (or more inboard) radius, the mass of the shroud causes a reduced level of stress to the rotor blade. However, this type of shroud leaves a portion of the airfoil of the rotor blade unrestrained or cantilevered which is the portion of the airfoil that extends outboard of the mid-span shroud. This cantilevered portion of the airfoil typically results in lower frequency vibration and increased vibratory loads.

To address the vibration and load concerns, reducing an overall weight of the outboard portion of the blade may be beneficial. The reduction should also desirably alter the frequency and mode shape of the blade. This alteration will enhance blade and turbine efficiency.

Figure 1:
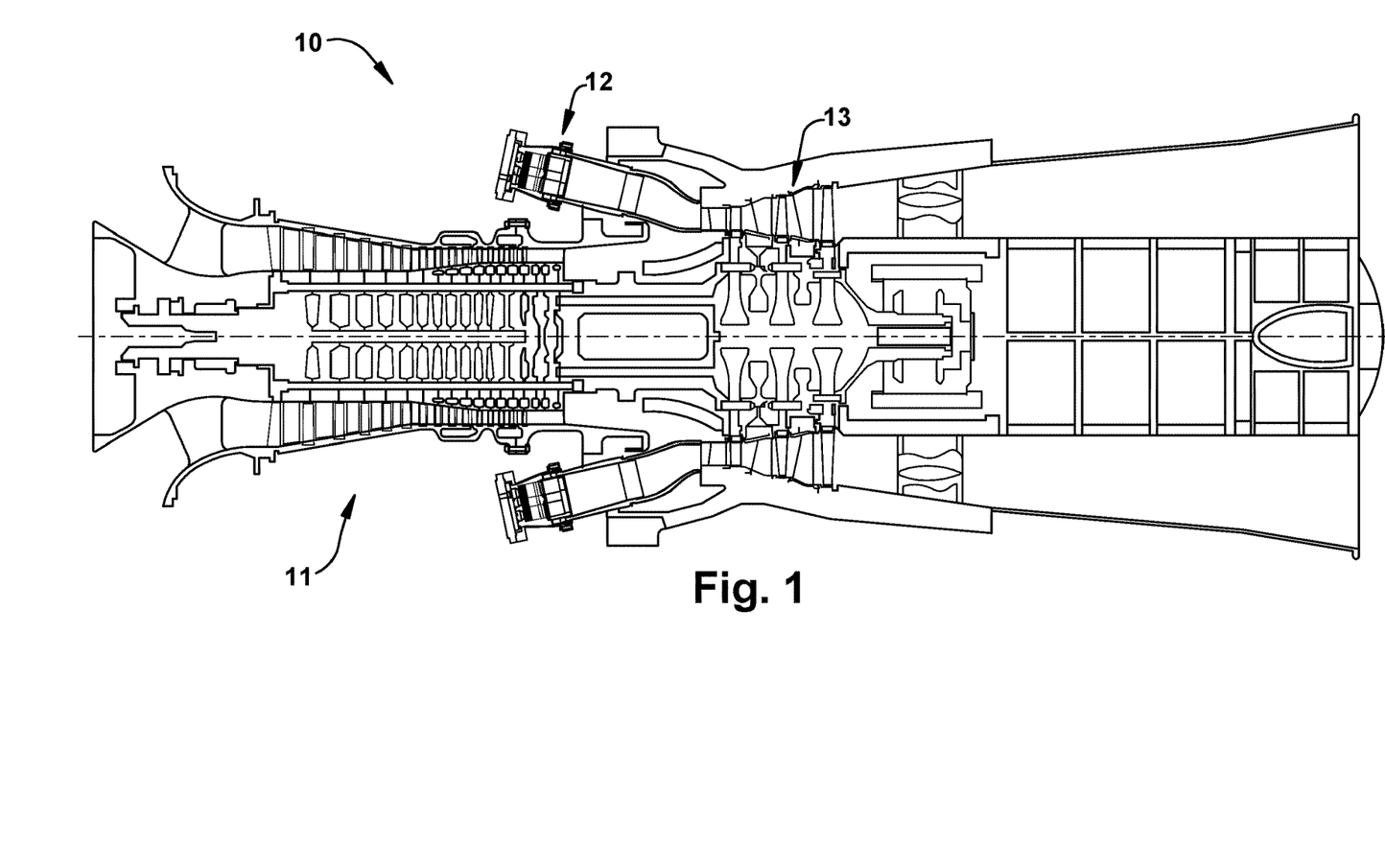
FIG. 1 is a schematic representation of an exemplary combustion turbine engine in which embodiments of the present application may be used.
Figure 2:
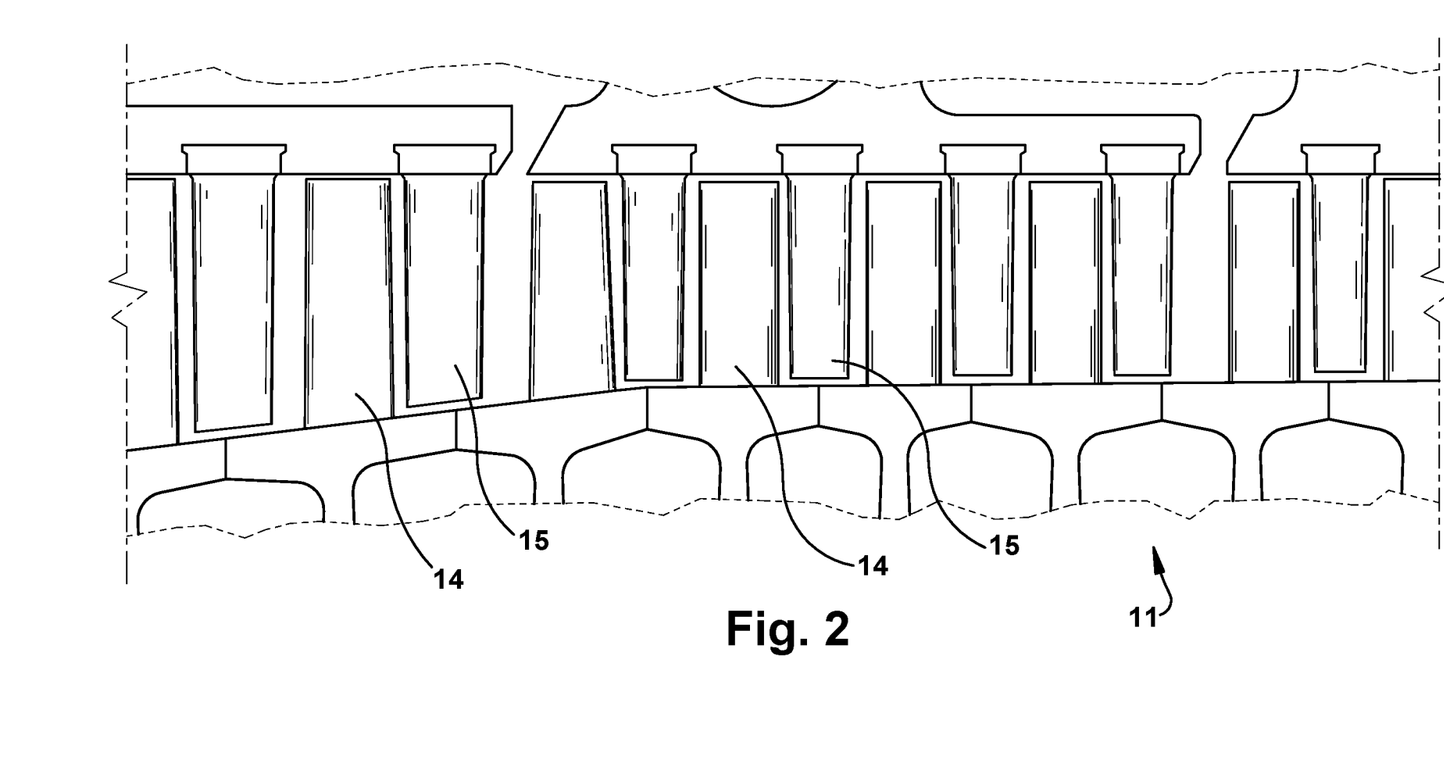
FIG. 2 is a sectional view of the compressor in the combustion turbine engine of FIG. 1.
Figure 3:
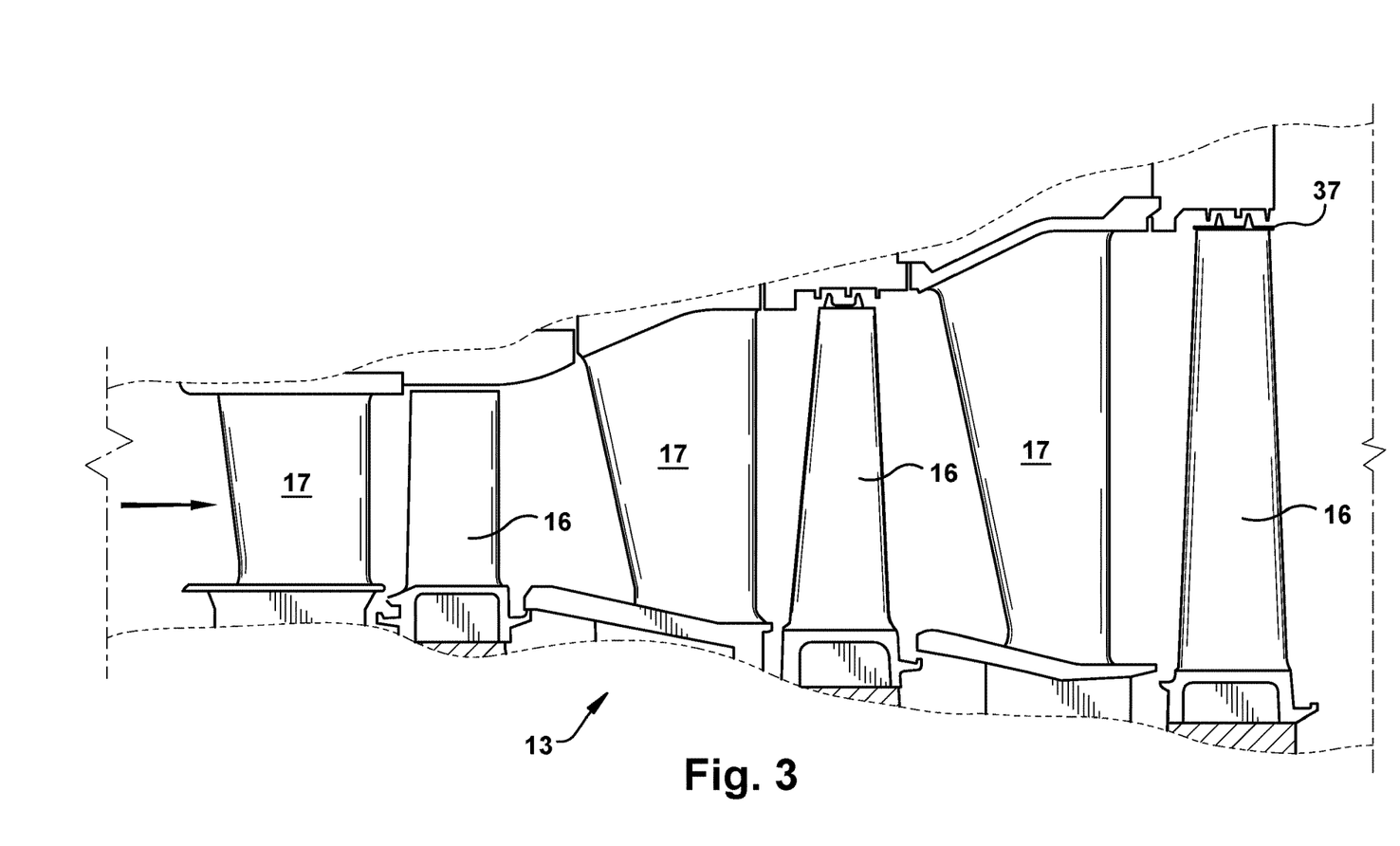
FIG. 3 is a sectional view of the turbine in the combustion turbine engine of FIG. 1.

By way of background, referring now to the Figures, FIGS. 1 through 3 show an illustrative combustion turbine engine in which embodiments of the present application may be used. It will be understood by those skilled in the art that the present embodiments are not limited to this type of usage. As stated, the present embodiments may be used in combustion turbine engines, such as the engines used in power generation and airplanes, steam turbine engines, and other type of rotary engines.

FIG. 1 is a schematic, non-limiting, representation of a combustion turbine engine 10. In general, combustion turbine engines operate by extracting energy from a pressurized flow of hot gas produced by the combustion of a fuel in a stream of compressed air. As illustrated in FIG. 1, combustion turbine engine 10 may be configured with an axial compressor 11 that is mechanically coupled by a common shaft or rotor to a downstream turbine section or turbine 13, and a combustor 12 positioned between compressor 11 and turbine 13.

FIG. 2 illustrates a view of an exemplary, non-limiting, multi-staged axial compressor 11 that may be used in the combustion turbine engine of FIG. 1. As shown, compressor 11 may include a plurality of stages. Each stage may include a row of compressor rotor blades 14 followed by a row of compressor stator nozzles 15. Thus, a first stage may include a row of compressor rotor blades 14, which rotate about a central shaft, followed by a row of compressor stator nozzles 15, which remain stationary during operation. The compressor stator nozzles 15 generally are circumferentially spaced one from the other and fixed about the axis of rotation. The compressor rotor blades 14 are circumferentially spaced and attached to the shaft. When the shaft rotates during operation, compressor rotor blades 14 rotate with it. Compressor rotor blades 14 are configured such that, when spun about the shaft, they impart kinetic energy to the air or fluid flowing through compressor 11. Compressor 11 may have other stages beyond the stages that are illustrated in FIG. 2. Additional stages may include a plurality of circumferential spaced compressor rotor blades 14 followed by a plurality of circumferentially spaced compressor stator nozzles 15.

FIG. 3 illustrates a non-limiting, partial view of an exemplary turbine section or turbine 13 that may be used in the combustion turbine engine of FIG. 1. Turbine 13 also may include a plurality of stages. Three exemplary stages are illustrated, but this is merely exemplary and is non-limiting and not intended to restrict the embodiments in any manner. Accordingly, more or less stages may be present in turbine 13. A first stage includes a plurality of turbine buckets or turbine rotor blades 16 (hereinafter "blades"), which rotate about the shaft during operation, and a plurality of nozzles or turbine stator blades 17 (hereinafter "nozzles"), which remain stationary during operation. Nozzles 17 generally are circumferentially spaced one from the other and fixed about the axis of rotation. Turbine rotor blades 16 may be mounted on a turbine wheel or disc (not shown) for rotation with the shaft (not shown). A second stage of turbine 13 also is illustrated. The second stage similarly includes a plurality of circumferentially spaced nozzles 17 followed by a plurality of circumferentially spaced turbine rotor blades 16, which are also mounted on a turbine wheel for rotation. A third stage also is illustrated, and similarly includes a plurality of nozzles 17 and rotor blades 16. It will be appreciated that nozzles 17 and turbine rotor blades 16 lie in the hot gas path of turbine 13. The direction of flow of the hot gases through the hot gas path is indicated by the arrow. Turbine 13 may have other stages beyond the stages that are illustrated in FIG. 3. Each additional stage may include a row of nozzles 17 followed by a row of turbine rotor blades 16.

In a non-limiting description of use, rotation of compressor rotor blades 14 within axial compressor 11 may compress a flow of air. In combustor 12, energy may be released when the compressed air is mixed with a fuel and ignited. The resulting flow of hot gases from combustor 12, which may be referred to as the working fluid, is then directed over turbine rotor blades 16, the flow of working fluid inducing the rotation of turbine rotor blades 16 and the shaft. Thereby, energy of the flow of working fluid is transformed into mechanical energy of the rotating blades and, because of the connection between the rotor blades and the shaft, the shaft rotates. The mechanical energy of the shaft may then be used to drive the rotation of compressor rotor blades 14, such that the necessary supply of compressed air is produced, and also, for example, a generator to produce electricity.

As used herein and as depicted on FIGS. 4-7, blades 16 include an airfoil 25. Blade 16 includes a root or base 121 at one end attachable to a rotor, and an outboard tip end 41 at an opposed tip end of the airfoil 25 from the base 121. Airfoil 25 includes at least one of and preferably a plurality mid-span shrouds 51. With reference to the mid-span shrouds 51, the airfoil 25 defines an inboard portion of the airfoil 25 between the mid-span shrouds 51 and the base 121 of the blade 16, with an "inboard" orientation or direction being toward the base 121 of the airfoil 25. Further, with reference to mid-span shrouds 51, airfoil 25 defines an outboard portion of the airfoil 25 between the mid-span shrouds 51 and the outboard tip end 41 of the blade 16, with an "outboard" orientation or direction being toward outboard tip end 41 of the airfoil 25.

Also, airfoil 25 has an inboard region 58, which is the portion of airfoil 25 that is radially inboard of at least one of a plurality mid-span shrouds 51. Airfoil 25 also has an outboard region 59, which is the portion of airfoil 25 that is radially outboard of mid-span shrouds 51.

The embodiments will be described hereinafter with reference to a blade that includes mid-span shrouds, however, the features of the instant embodiments are not intended to be limited to a blade with mid-span shrouds. The features as disclosed herein are applicable to blades with or without mind-span shrouds.

Figure 4:
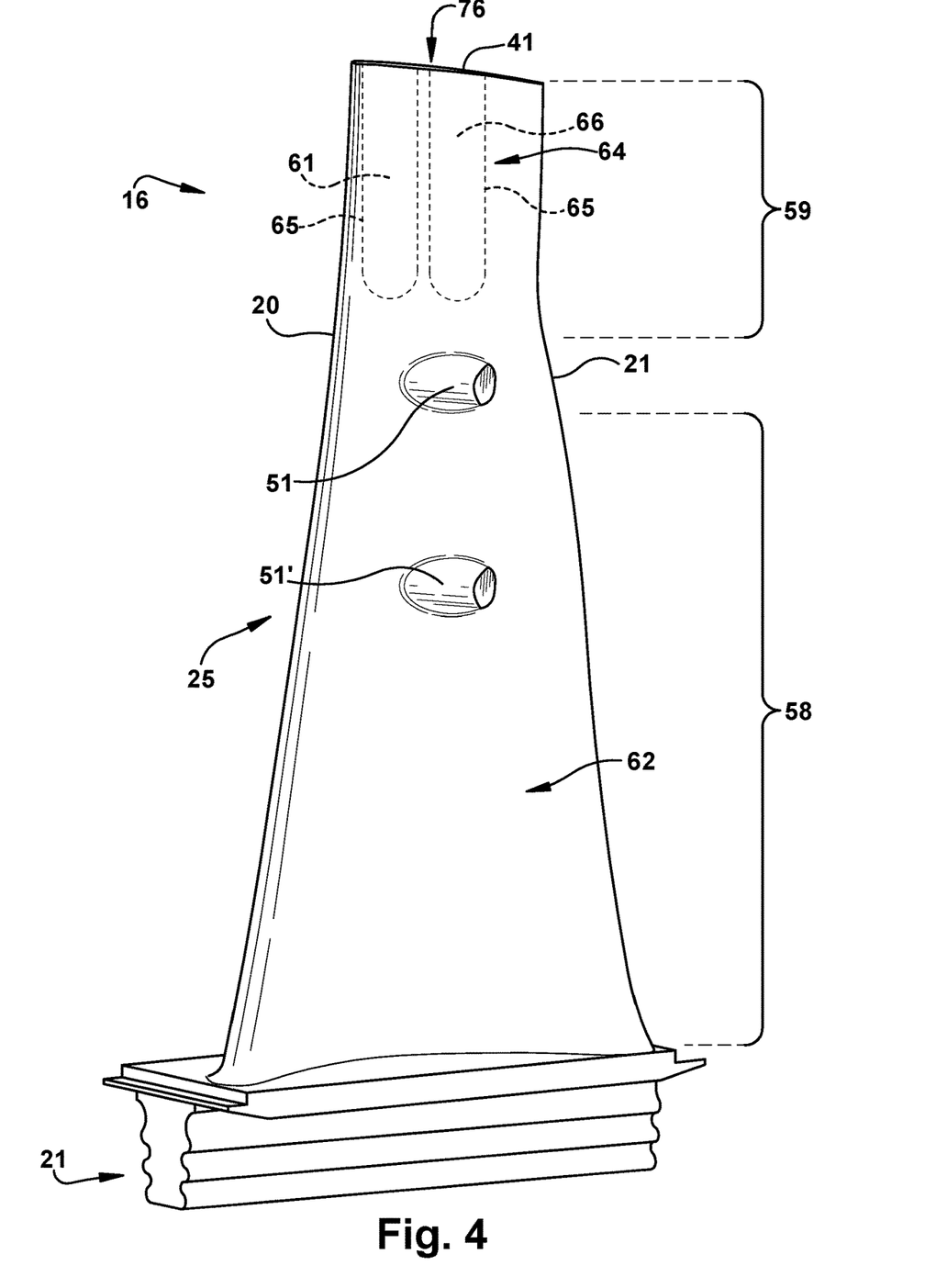
FIG. 4 is a schematic representation of an exemplary rotor blade having mid-span shrouds and internal configurations according to an embodiment of the present disclosure.
Figure 5:
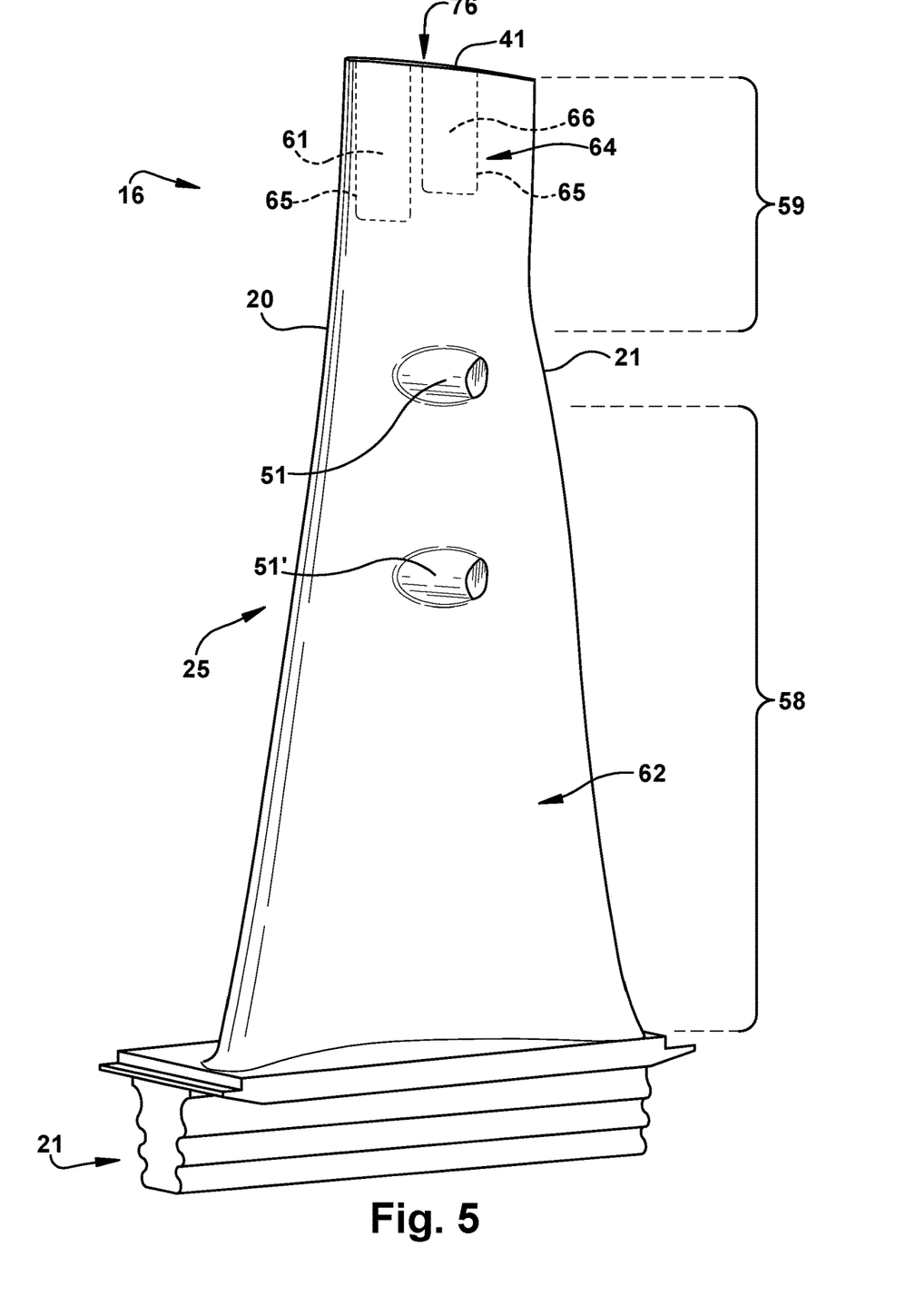
FIG. 5 is a side view of a blade with cavities and internal configurations according to an embodiment of the present disclosure.
Figure 6:
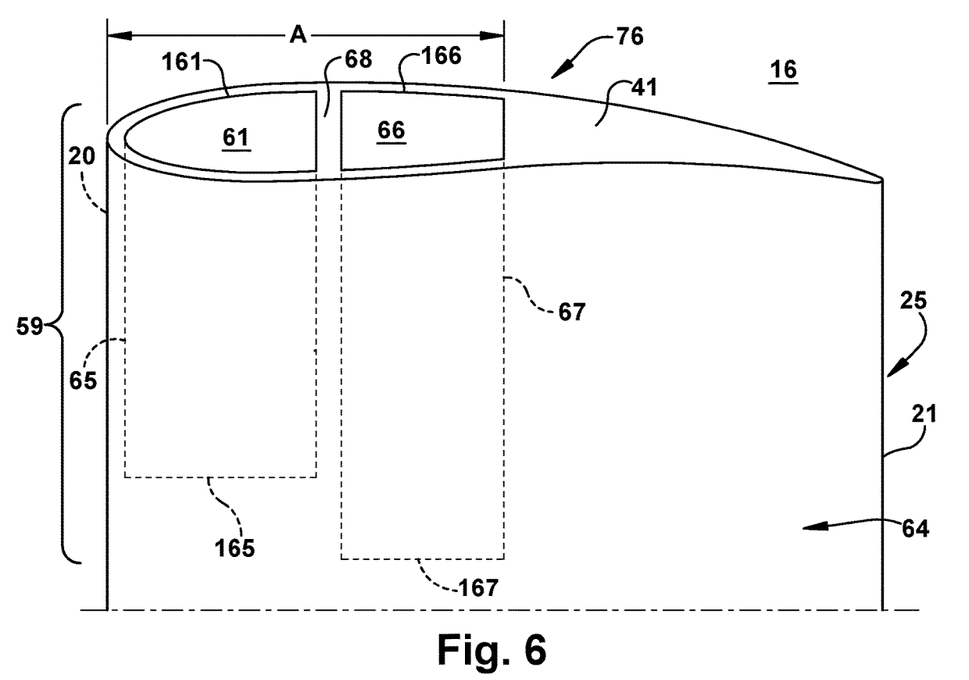
FIGS. 6, 8, and 9 are side views of a blade outboard region with cavities and internal configurations according to embodiments of the present disclosure.
Figure 7:
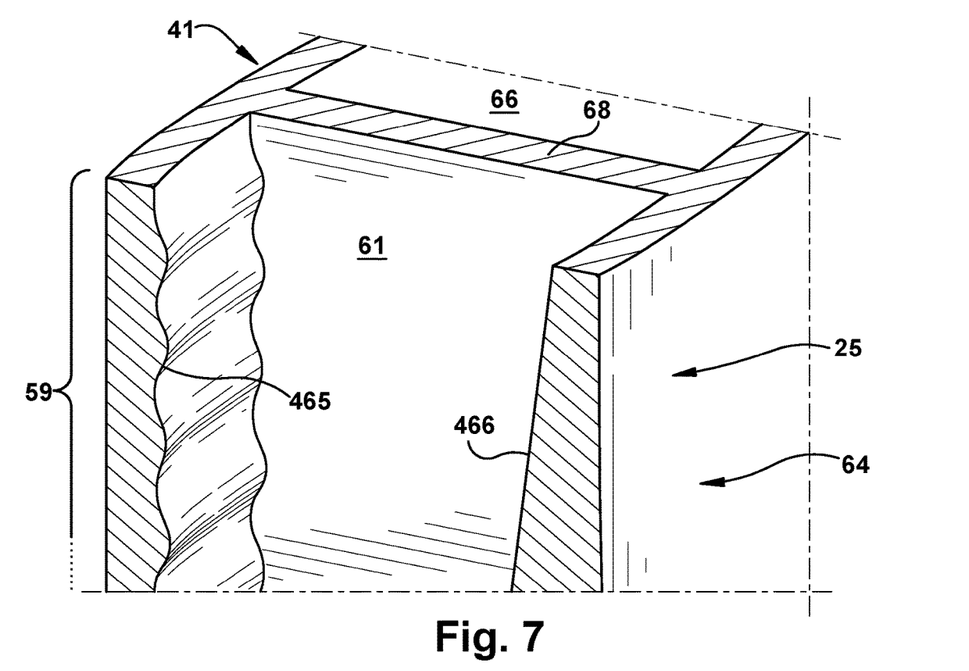
FIG. 7 is partial sectional top view of a rotor blade outboard region with cavities, in accordance with embodiments of the present disclosure.

FIGS. 4 and 5 are side views of a rotor blade 16 having a mid-span shrouds 51 and 51', and internal structure or configuration (which is shown via the dotted lines) according to embodiments of the present disclosure. FIGS. 6 and 7 illustrate the embodiment of the disclosure with focus on outboard region 59 of airfoil 25, as described hereinafter.

According to embodiments of the present disclosure, inboard region 58 is solid or substantially solid, and outboard region 59 is hollow or "substantially" hollow. As used herein outboard region 59 includes a hollow region 6 4 that is any region or space within airfoil 25 that is hollow, such as cavities 61 and 66 formed therein (discussed below). Also, inboard region includes a solid region 62 that is any region or space within airfoil 25 that is substantially solid material. In accordance with non-limiting aspects of the embodiments, outboard region 59 has a hollowness percentage of at least 40% and inboard region 58 has a solidness percentage of at least 60%.

According to embodiments of the present disclosure, outboard region 59 may include at least two cavities 61 and 66 formed therein. As shown, the at least two cavities 61 and 66 are closed at their inboard end and in the outward orientation are open at outboard tip end 41 of airfoil 25. As illustrated in FIGS. 4-7, cavities 61 and 66 take up volume between pressure sidewall and a suction sidewall of airfoil 25. In accordance with non-limiting aspects of the disclosure, the at least two cavities 61 and 66 can be entirely in outboard region 59 above mid-span shrouds 51 and 51'.

While the Figures illustrate two cavities, the two cavities 61 and 66 are merely non-limiting and illustrative of the scope of the embodiments. Embodiments herein are not intended to be limited by the Figures. More than two cavities are within the scope of the disclosure.

Cavities 61, 66 in outboard region 59 includes sidewalls 65 and 67, respectively and bottom walls 165 and 167, respectively. As embodied in one non-limiting aspect of the disclosure, bottom walls 165 and 167 of cavities 61, 66 can be equi-distant into airfoil 25. However, cavities 61, 66 need not extend generally equi-distant, but can extend varying unequal distances into airfoil 25. As illustrated in another non-limiting aspect in FIGS. 5 and 6, bottom walls 165 and 167 of cavities 61, 66 do not need to be equidistant toward inboard region 58.

Moreover, according to other non-limiting aspects of the embodiments, bottom walls 165 and 167 can be generally orthogonal with the sidewalls 65 and 67, as per FIG. 6. While the Figures illustrate the bottom walls to be generally orthogonal to sidewalls, the scope of the embodiments do not restrict the bottoms walls to be generally orthogonal. As also illustrated in FIG. 6, a further non-limiting aspect of the embodiments can provide bottom walls angled from sidewalls 65 and 67, as indicated by dashed sidewalls 265 and 267.

Figure 9:
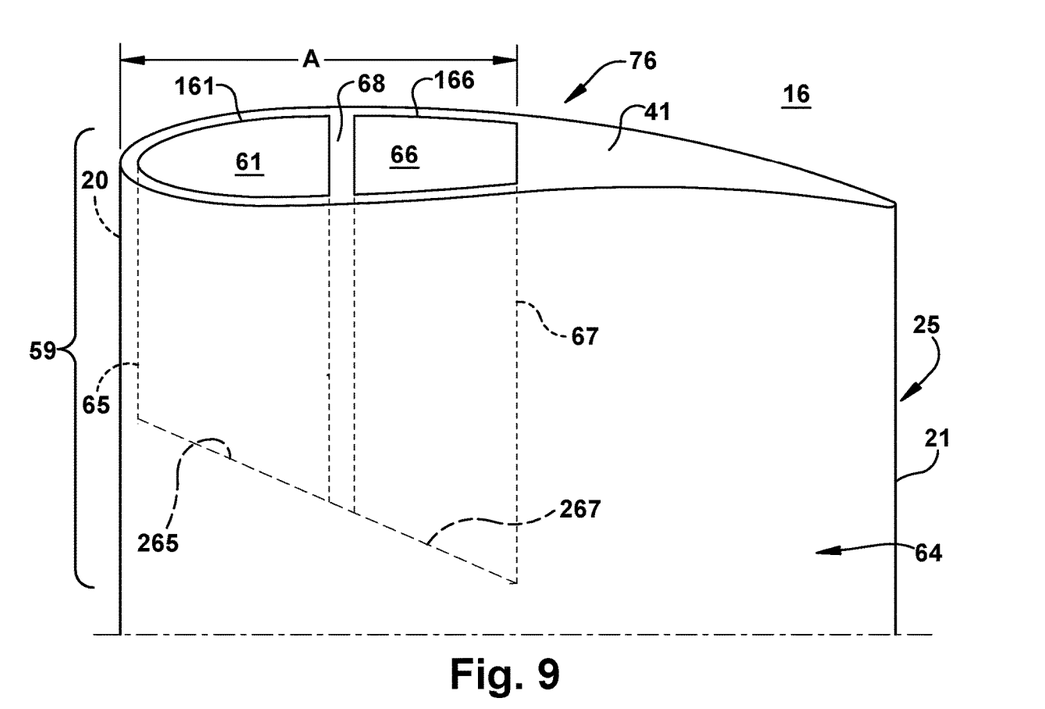

Additionally, in other non-limiting aspects of the embodiments, the angles of the bottom walls 265 and 267 (FIG. 9) could be intersecting, angled extending from leading edge 20 to trailing edge 21 of airfoil 25, angled extending from trailing edge 21 to leading edge 20 of airfoil 25, angled from pressure side to suction side, angled from suction side to pressure side, and/or one bottom wall 265 and 267 angled extending from leading edge 20 to trailing edge 21 of airfoil 25 while the other bottom wall 265 and 267 (FIG. 9) is angled extending from trailing edge 21 to leading edge 20 of airfoil 25.

Figure 8:
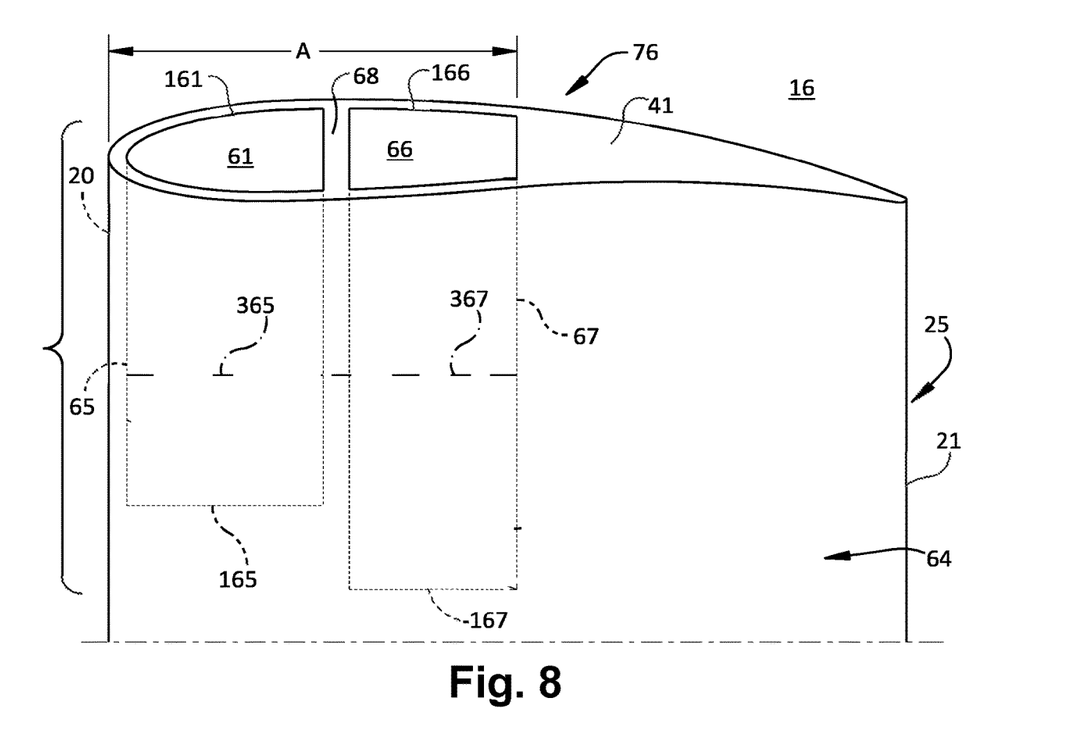

Further, non-limiting aspects of the disclosure's embodiments also include bottom walls that are equi-distant into airfoil 25 from outboard tip end 41 from the sidewalls 65 and 67, as indicated by dashed and dotted sidewalls 365 and 367 in FIG. 8. Other alternative arrangements of the bottom walls can incorporate orthogonal bottom walls with angled sections, curved bottom walls, and any combination of bottom walls in accordance to the non-limiting and illustrative description herein.

The illustrated embodiments set forth two cavities 61 and 66. This configuration of two cavities is non-limiting of the embodiments and merely illustrative of the number of cavities that can be provided herein. More than two cavities 61 and 66 can be provided in airfoil 25. In the illustrated configuration of FIG. 7, a stiffening rib 68 is formed in airfoil 25 at outboard tip end 41 between each cavity 61 and 66. Stiffening rib 68 provides enhanced structural integrity and overall strength to the airfoil, especially with the reduced mass in airfoil 25 at cavities 61 and 66 at outboard region 59. Of course, if more than two cavities are provided, more stiffening ribs 68 will be created, further enhancing integrity of the airfoil.

As illustrated in FIG. 6, cavities 61 and 66 at outboard region 59 extend a distance A from leading edge 20 towards trailing edge 21. Given the configuration of airfoil 25, it is desirable that distance A be no more than about 60% of airfoil 25, which should retain integrity and overall strength in airfoil 25 proximate trailing edge 21 with more solid mass compared to the cavities at area of airfoil 25 proximate leading edge 20. So, outboard region 59 has more solid material but still with a reduced weight, thereby reducing vibration and load. Aspects of the embodiments could also include a distance A that is less than 60% of airfoil 25.

In accordance with another facet of the embodiments, each cavity 61 and 66 can have varying volumes. As noted above, any of the herein described bottom walls of cavities 65, 67 need not be equal. Also, noting the configuration of airfoil 25, each cavity will have a distinct periphery to confirm with the airfoil's shape and profile. For example and in a non-limiting example in FIG. 6, cavity 61 defines a first perimeter 161 of sidewall 65, and cavity 66 defines a second perimeter 166 of sidewall 65. These perimeters 161 and 166 are not necessarily equal, and thus an area of the respective cavities 61, 66 may not be equal even if the bottom walls extend to the same depth in hollow region 64.

Also, sidewalls of cavities 61 and 66 can vary along the depth of cavities 61 and 66. For example and not intending to limit the embodiments in any manner, FIG. 7 illustrates cavity 61 with two differing, non-limiting of the embodiments, sidewalls 465 and 466. Sidewall 465 is a roughened irregular sidewall. Sidewall 466 tapers increasing in width from outboard tip end 41 towards its bottom wall (omitted for ease of illustration). These sidewall structural arrangements are merely of multiple non-limiting sidewall structures, in whatever form that the end wall (as discussed above) takes. In other words, the geometry of cavities 61 and 66 can be different. The volume of cavities 61 and 66 can be unequal, as the depth of cavities 61, 66 into hollow region 64 can vary, the configurations, orientations, and angles of side and bottom wall can vary. Further peripheral area of each cavity can vary. All of these variations permit the volume of cavities 61 and 66 to not be necessarily equal. However, as can be envisioned, volumes of cavities 61 and 66 can be the same if above factors determining the cavity volume are selected to be equated in a volumetric determination.

Blade 16, as embodied by the disclosure, provides an airfoil 25 with a reduced overall weight with cavities 61 and 66. The reduced overall weight should inhibit vibrations, and excitation forces on blade 16 during operation. Blade 16 including cavities 61 and 66 is capable of reducing vibrational forces and any loads therein over blade 16. Moreover, a blade 16 with reduced weight provided by cavities 61 and 66 can reduce amplitudes of vibration forces (or natural frequency) so the mode shape or deflection at the natural frequency of such a blade is lower (compared to a blade without cavities 61 and 66). Thus, degradation of a blade 16 with cavities 61 and 66 may be reduced.

Mid-span shrouds 51 and 51', according to the present disclosure, may be defined broadly to include any shroud that is positioned inboard of an outboard tip end 41 of airfoil 25 and outboard of a base 121. In accordance with non-limiting aspects of the disclosure, as noted above, the at least two cavities 61 and 66 should be entirely in outboard region 59 above mid-span shrouds 51 and 51'.

Mid-span shrouds 51 and 51' according to present disclosure also may be disposed within a range of radial positions on airfoil 25. According to certain embodiments of the present disclosure, the range of positions of mid-span shrouds 51 and 51' is defined between an inboard boundary of approximately 25% of the radial height of airfoil 25 and an outboard boundary of approximately 75% of the radial height of airfoil 25. According to other embodiments of the present disclosure, as may be defined by the appended claims, the range of positions of a mid-span shrouds 51 and 51' is defined between an inboard boundary of approximately 33% of the radial height of airfoil 25 and an outboard boundary of approximately 66% of the radial height of airfoil 25. According to certain embodiments of the present disclosure, a mid-span shrouds 51 and 51' are positioned near the approximate radial center region of airfoil 25.

It will appreciated that, pursuant to the non-limiting and illustrative several embodiments discussed above, vibratory response of turbine blades may be reduced to limit the damaging mechanical loads, which may enable lengthening of rotor blades so that greater engine efficiencies can be achieved. That is, the present disclosure teaches providing cavities 61 and 66 in turbine blades to limit the vibratory response of outboard region 59 that extends beyond the one or more mid-span shrouds 51 and 51', which thus increases the stiffness and decreases the portion of airfoil 25 outboard of mid-span shrouds 51 and 51'. In this manner, harmful vibrations can be avoided, thereby allowing for longer turbine blades.

While the disclosure has been described in connection with what is presently considered to be the most practical and preferred embodiment, it is to be understood that the disclosure is not to be limited to the disclosed embodiment, but on the contrary, is intended to cover various modifications and equivalent arrangements included within the spirit and scope of the appended claims.

What is claimed:

1. A rotor blade for use in a turbine of a combustion turbine engine, the rotor blade comprising:
   an airfoil, the airfoil including a concave pressure sidewall and a convex suction sidewall extending axially between corresponding leading and trailing edges and radially between a base and an outboard tip end, the rotor blade further including:
   at least one mid-span shroud configured to engage a corresponding mid-span shroud on at least one neighboring rotor blade during operation;
   the airfoil further including an inboard region between the at least one mid-span shroud and the base of the blade with an inboard direction of the airfoil toward the base;
   the airfoil further including an outboard region between the at least one mid-span shroud and an outboard tip end of the blade with an outboard direction of the airfoil toward the outboard tip end;
   wherein:
   i. the outboard region includes at least two cavities extending from the outboard tip end inboard of the airfoil toward the at least one mid-span shroud, wherein the at least two cavities include sidewalls and bottom walls, each respective bottom wall of the at least two cavities being at different angles respect to each other and the sidewalls; and ii. inboard of the at least one mid-span shroud, the inboard region is substantially solid.

2. The rotor blade of claim 1, wherein the bottom walls extending different distances into the airfoil.

3. The rotor blade of claim 1, wherein the bottom walls are non-orthogonal to the sidewalls.

4. The rotor blade of claim 1, wherein the at least two cavities include varying cross sections.

5. The rotor blade of claim 4, wherein the varying cross sections are formed by a depth of the cavities along the sidewalls of the at least two cavities.

6. The rotor blade of claim 1, wherein the at least two cavities are open at the outboard tip end and closed at their inboard ends.

7. The rotor blade of claim 1, wherein the at least two cavities include more than two cavities formed along a chord of the blade.

8. The rotor blade of claim 1, wherein, at the outboard tip end, the at least two cavities extend up to 60% of the outboard tip end from the leading edge to the trailing edge.

9. The rotor blade of claim 1, wherein the at least two cavities define a stiffening rib therebetween.

10. The rotor blade of claim 1, wherein the at least two cavities are entirely in the outboard region above the at least one mid-span shroud.

11. The rotor blade of claim 1, wherein the outboard region has hollowness percentage of at least 40% and wherein the inboard region has a solidness percentage of at least 60%.

12. A combustion turbine engine, the combustion turbine engine comprising:
   a rotor blade including an airfoil, the airfoil including a concave pressure sidewall and a convex suction sidewall extending axially between corresponding leading and trailing edges; a base and an outboard tip end, the rotor blade further including:
   at least one mid-span shroud configured to engage a corresponding mid-span shroud on at least one neighboring rotor blade during operation;
   the airfoil further including an inboard region between the at least one mid-span shroud and the base of the blade with an inboard direction of the airfoil toward the base;
   the airfoil further including an outboard region between the at least one mid-span shroud and an outboard tip end of the blade with an outboard direction of the airfoil toward the outboard tip end;
   wherein:
   i. the outboard region includes at least two cavities extending from the outboard tip end inboard of the airfoil toward the at least one mid-span shroud, wherein the at least two cavities include sidewalls and bottom walls, each respective bottom wall of the at least two cavities being at different angles respect to each other and the sidewalls; and inboard of the at least one mid-span shroud, the inboard region is substantially solid.

13. The combustion turbine engine of claim 12, wherein the outboard region being substantially hollow is defined as the outboard region having a hollowness percentage of at least 70% and wherein the inboard region being substantially solid is defined as the inboard region having a solidness percentage of at least 90%.

14. The combustion turbine engine of claim 12, wherein the at least two cavities include more than two cavities.

15. The combustion turbine engine of claim 12, wherein the at least two cavities are entirely in the outboard region.

16. The combustion turbine engine of claim 12, wherein the bottom walls extending different distances into the airfoil.

17. The combustion turbine engine of claim 12, wherein the at least two cavities include more than two cavities formed along a chord of the blade.

18. The combustion turbine engine of claim 12, wherein the bottom walls are non-orthogonal to the sidewalls.

19. A combustion turbine engine, the combustion turbine engine comprising:
   a rotor blade including an airfoil, the airfoil including a concave pressure sidewall and a convex suction sidewall extending axially between corresponding leading and trailing edges; a base and an outboard tip end, the rotor blade further including a midsection area:
   the airfoil further including an inboard region between the midsection area and the base of the blade with an inboard direction of the airfoil toward the base;
   the airfoil further including an outboard region between the midsection area and an outboard tip end of the blade with an outboard direction of the airfoil toward the outboard tip end;
   wherein:
   i. the outboard region includes at least two cavities extending from the outboard tip end inboard of the airfoil toward the midsection area, wherein the at least two cavities include sidewalls and bottom walls, each respective bottom wall of the at least two cavities being at different angles respect to each other and the sidewalls; and inboard of midsection area, the inboard region is substantially solid.

* * * * *